Sept. 8, 1953　　　　E. G. PERRY, JR., ET AL　　　　2,651,754
ELECTRICAL METER
Filed Dec. 1, 1949　　　　　　　　　　　　　　　2 Sheets-Sheet 1

INVENTORS
*Edward Gordon Perry, Jr.*
*Robert W. Olson*
BY *Stevens, Davis, Miller & Mosher*
ATTORNEYS Sept. 8, 1953 E. G. PERRY, JR., ET AL 2,651,754
ELECTRICAL METER
Filed Dec. 1, 1949 2 Sheets-Sheet 2

INVENTORS
Edward Gordon Perry, Jr. &
Robert W. Olson
BY Stevens, Davis, Miller & Mosher
ATTORNEYS Patented Sept. 8, 1953

2,651,754

UNITED STATES PATENT OFFICE 2,651,754

ELECTRICAL METER

Edward Gordon Perry, Jr., and Robert W. Olson, Dallas, Tex., assignors to Texas Instruments Incorporated, a corporation of Delaware Application December 1, 1949, Serial No. 130,413

7 Claims. (Cl. 324—92)

This invention relates to instruments for measuring electrical currents and particularly to an electrical meter movement that will produce relatively high torque for relatively small changes in electrical current, thus making it particularly suitable for use in high speed, electrical recorders.

Prior to this invention, most electrical meter movements were in effect small electrical motors that developed a torque having some functional relation to the amount of current that was passed through their windings. Generally, this torque was very small for small currents and, as a result, the meter movement had to be delicately mounted and any pointer or recording mechanism connected to it had to be light and delicately mounted, particularly if the instrument was to follow fairly rapid variations in current.

A number of arrangements have been proposed for the purpose of making a more rugged instrument, for the purpose of making an instrument that would respond more rapidly to current changes, and for the purpose of making an instrument that would respond linearly with respect to current. The present instrument, however, appears to be far simpler than most of the proposed constructions, can be made quite rugged, yet operates very rapidly in response to changes in current, is accurate, and can easily be arranged so as to be quite linear in its response.

Although the principles of this invention and the meter movement of this invention, can be applied to all kinds of electrical meters, they are particularly useful in electrical recorders where a high speed of response is necessary.

On or about April 2, 1948, the National Bureau of Standards, Washington, D. C., published a mimeographed pamphlet "General Information on Magnetic-Fluid Clutch." Attached to this pamphlet was "Technical Report 1213" entitled "The Magnetic Fluid Clutch." In these papers there was described in considerable detail a clutch that consisted of two or more rotatable clutch plates separated by a fluid containing magnetic particles, such as iron. Means were provided for applying a magnetic field to the fluid containing the magnetic particles and it was found that the application of a magnetic field to this fluid caused one of the clutch plates to transmit torque to the other. The transmitted torque increased as the amount of current in the field coil was increased and the curve of torque versus current was linear over a substantial portion of the range of operation.

Noting that the change in torque was quite large for small currents in the field coil of the clutch, the present inventors conceived the idea of utilizing such a clutch to actuate the pointer or recording stylus of an electrical measuring instrument. By driving one of the plates of the clutch at a constant speed and applying the current to be measured to the field coil of the clutch, a torque was developed in the driven plate of the clutch which was proportional to some function of the current to be measured and this driven plate could then be used to operate a pointer or recording pen, preferably against the torque of a hairspring.

In order to operate on the linear portion of the characteristic curve of the clutch, it was found desirable to bias the clutch during its operation to bring it to the linear part of its curve. This, it was found, could be done by arranging a spring or similar means to resist the motion of the pointer or recording pen, biasing the clutch itself to a slight extent either by the use of a permanent magnet or biasing current passed through the main field coil or supplemental field coil, and balancing this bias and the spring so that the measuring operation would take place on the flat part of the torque versus current curve.

Still further, these inventors have discovered that the linear range of operation of meter movement of this invention can be very considerably extended, and the sensitivity of the device increased, by connecting two magnetic-fluid clutches in a "push-pull" arrangement in which the two clutches are both biased so that they transfer appreciable torque, are then connected in opposition, and the field coils are so connected that a current passing through the field coils will decrease the torque transferred through one of the clutches and increase the torque transferred through the other. Thus the difference in torque, which is greater than the change in torque in either clutch by itself, can be used to operate the meter or recorder, and by proper biasing, the characteristic curves of the two clutches can be made to compensate for each other so that the combined characteristic curve is linear through a greatly extended range.

Even with the push-pull arrangement it is necessary to have a spring or some similar means to return the pointer or recorder pen to zero, in order for the instrument to measure or record current. However, it has been found that by omitting or minimizing the spring or similar means for returning the pointer or recording pen to zero, either the single clutch meter movement or the push-pull clutch meter movement has excellent ballistic characteristics and makes an excellent instrument for integrating current with respect to time.

Further details and advantages of this invention will be apparent from the following description of the presently preferred embodiment of this invention and the drawings illustrating that embodiment.

Figure 1:
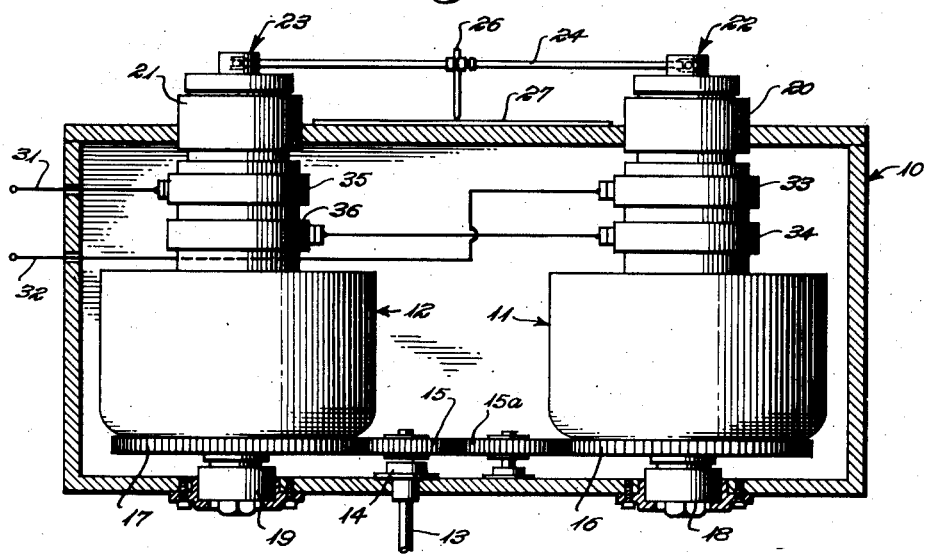
Figure 1 is a side view of the preferred embodiment of this invention, partly in section.
Figure 2:
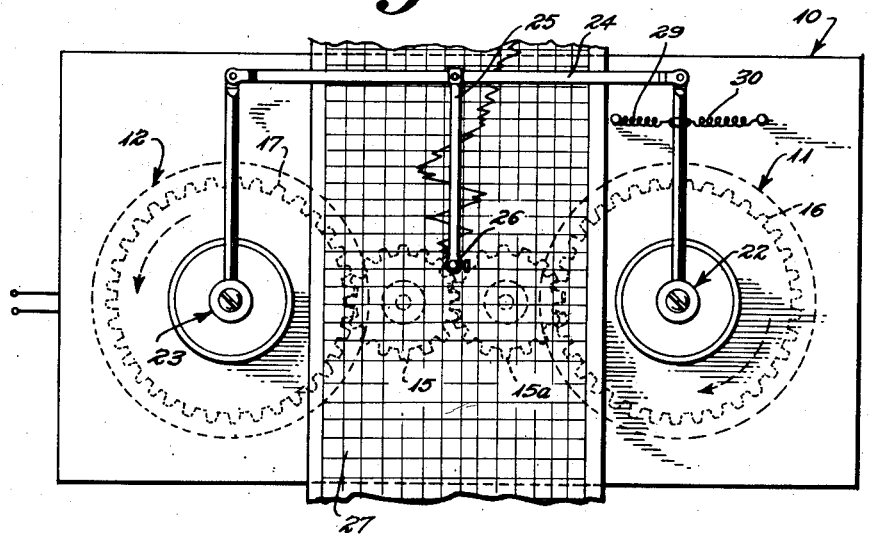
Figure 2 is a top view of the same device.

As illustrated in Figures 1 and 2, the preferred embodiment of this invention comprises a frame generally designated by the numeral 10 with two magnetic clutch units generally designated by the numerals 11 and 12, rotatably mounted therein. These clutches are rotated as a whole by means of a shaft 13 rotatably mounted in a bearing 14 in the bottom of the frame and driven by a constant speed power source, not shown. The shaft 13 carries on its upper end a spur gear 15 meshing with spur gears 15a and 17, respectively. Spur gear 15a is an idler meshing also with a spur gear 16 and gears 16 and 17 are on the clutches 11 and 12, respectively.

The clutches 11 and 12 are journalled at their bottom ends in ball bearings 18 and 19, respectively, carried by the frame 10. At their upper ends they are mounted respectively in friction bearings 20 and 21. Thus each entire clutch is rotated at a contsant speed, except for the driven plate of the clutch which is connected, as will be described later, to a hub and arm at the top of the clutch. These hubs and arm assemblies have been designated, respectively, 22 and 23.

The ends of the arms are pivotally connected to a link 24 so that the arms must move angularly in unison and a recorder pen 25 is connected to the link 24 so as to be moved thereby. This arm carries a recording stylus or pen 26 which cooperates with chart paper 27 which may be moved by any suitable mechanism as is well known.

With the two clutches being rotated in opposite directions at equal speeds and being biased so that they have equal torque transfer, the forces acting on the pivoted link 24 will be equal and opposite so that the recorder pen will stay in whatever position it is originally given. A pair of springs 29 and 30 may be attached to one of the moving arms of one of the clutches and have their opposite ends attached to the frame 10 on either side of the arm so as to automatically return the recorder pen to the zero position when the two clutches are in a balanced torque condition.

The current to be measured is applied through conductors 31 and 32 to the field coils of the two magnetic clutches. As shown in Figure 1, this is accomplished by the use of slip rings 33 and 34 on the clutch 11 and slip rings 35 and 36 on the clutch 12, and the wiring is such that the field coils are connected in series in the circuit in which the current is to be measured. However, these coils are connected in opposition so that current flow in one direction will increase the magnetic flux in one of the magnetic clutches and decrease the magnetic flux in the other. Thus, when a current is passed through the field coil circuit, the torque in one of the clutches will decrease and the torque in the other clutch will increase correspondingly.

Figure 3:
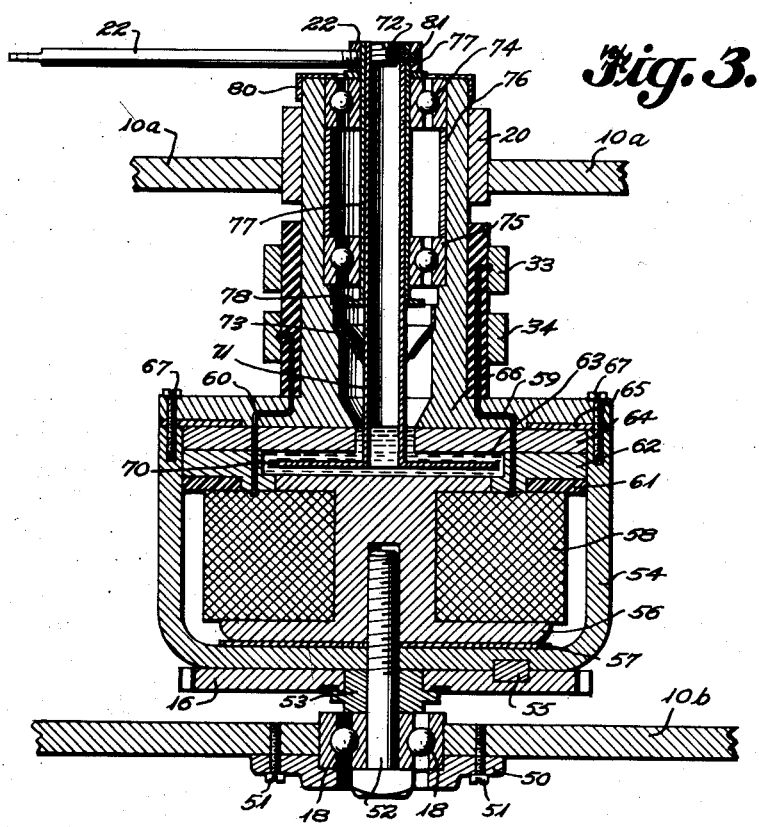
Figure 3 is a sectional side view of one of the magnetic clutches of this invention.
Figure 4:
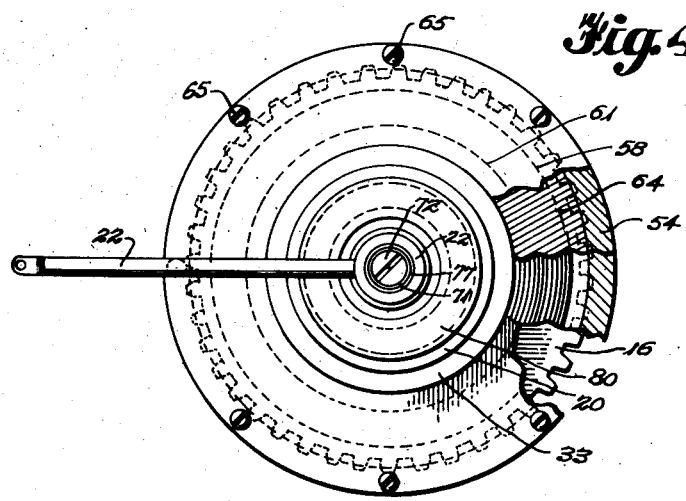
Figure 4 is a top view of the same magnetic clutch with certain parts cut away to facilitate illustration.

The details of the preferred clutch construction are shown in Figures 3 and 4. In these figures a portion of the top part of the frame is designated as 10a and a portion of the bottom part of the frame is designated as 10b. The clutch is mounted in these frame members by means of ball bearings 18 set in an opening in the lower frame member 10b and held in place by cover plate 50 attached to the lower frame member 10b by machine screws 51. The clutch is mounted on the inner race of these ball bearings by means of a cap screw 52 which passes upward into the center pole piece of the clutch. Immediately above the center ball race is a spacer ring 53 upon which rests a driving gear 16 and the cup-shaped outer shell 54 of the magnetic-fluid clutch. This cup-shaped member 54 is a part of the magnetic circuit of the clutch and hence is of magnetic material. It is keyed to the driving gear 16 by key 55 so that it will rotate therewith.

Within the cup-shaped shell 54 is a spool-shaped center pole piece 56 into which the cap screw 52 is threaded. This pole piece is of magnetic material and rests on a washer 57 which in turn rests on the bottom of the cup-shaped member 54. The washer 57 is a permanent magnet of a peculiar type in which the flux lines tend to extend across the material in the short direction. That is, the flux lines in this magnet are vertical although the washer is much wider than it is high.

It has been found preferable to use a material known as Silmanal for this purpose. Silmanal is a trade name for a permanent magnet material having the characteristics mentioned above, and is essentially an alloy of silver, manganese and aluminum.

Wound on the spool-shaped center pole piece 56 is a field coil 58 and the ends of this coil are connected by the conductors 59 and 60 to the slip rings 33 and 34 shown in Figure 1. On top of the field coil 58 and within the cup-shaped shell 54 is positioned a Bakelite ring 61, and on top of this ring a brass ring 62 which fits around the top edge of the spool-shaped member 56 and with it forms the bottom and sides of the fluid chamber of the clutch. This chamber has been designated as 63.

The top of the fluid chamber 63 is an annular plate of magnetic material 64 which fits just inside of the top edge of the cup-shaped shell 54. A small ring or washer of magnetic material 65 is arranged to overlie the abutting edges of the washer 64 and the cup-shaped shell 54 so as to lower the magnetic reluctance at the point of juncture. Thus the magnetic circuit, if we start from the clutch chamber 63, passes through the spool-shaped member 56, the permanent magnet 57, the cup-shaped shell 54, the washer 64, and back through the clutch chamber 63. The small washer 65 helps to reduce the magnetic reluctance of this circuit.

On top of this structure is mounted an aluminum head or extension 66. This head or extension is held in place by means of machine screws 67 which pass down through the head 66 into the cup-shaped shell 54.

The upper end of the magnetic clutch is held in position by the friction bearing 20 which may either be joined rigidly to the aluminum head 66 and free to rotate in the upper frame member 10a or vice versa. The head member 66 also carries the slip rings 33 and 34 which are insulated from it by a cylinder of insulating material 68. The inside of the head member 66 is bored so that the driven disc of the clutch can be properly journalled therein.

The driven disc 70 rotates in the clutch chamber 63 and is supported at the bottom end of a tubular shaft 71. This shaft passes upwardly through the bore in the head member 66 and the clutch disc 70 has a hole through it at the bottom of this tubular shaft so that clutch fluid can be inserted through the tubular shaft and flow out under the clutch disc and around the clutch disc to fill the clutch chamber 63. The top of the tubular shaft is normally closed by a set screw 72.

In order that fluid from the clutch chamber 63 be not lost if the clutch is tilted or even turned upside down, a baffle 73, shaped like a funnel, is mounted in the bore of the head member 66 somewhat above the clutch plate and the bore is sufficiently enlarged below this baffle so that it will accommodate any clutch fluid that flows upward in the bore if the device is tilted.

In order that the parts of the clutch may be expediently assembled and the position of the driven disc properly adjusted after the assembly, the top end of the head member 66 is bored to receive two sets of ball bearings 74 and 75. These ball bearings are spaced by a sleeve 76 positioned between them. Mounted inside of these ball bearings is a sleeve 77 into which the tubular shaft 71 slidably fits. The lower end of this outer tube 77 is flanged to form a slinger ring 78 which also tends to prevent the escape of magnetic fluid upwardly along the tubular shaft 71 on the sleeve 77.

After the device has been assembled, a cover plate 80 is placed on the top of the head member 66, the position of the tubular shaft 71 is carefully adjusted to properly space the driven clutch disc 70 in the clutch chamber 63 and the hub and arm unit 22 is fastened to the top end of the outer tubular member 77 and the tubular shaft 71 by means of a set screw 81. This positions the driven clutch disc relative to the tubular member 77 that is carried in the ball bearings and it also fixes the hub and arm unit 22 to the tubular shaft 71 and the sleeve 77.

It will at once be apparent that many details of the above device may be varied within relatively wide limits without departing from the scope of this invention and it will also be apparent that within the somewhat broader scope of this invention a single magnetic clutch may be used as an electrical meter movement or as the driving element of an electrical recorder. The device constructed in accordance with this invention may be used also in servo-mechanisms and computers. In such systems, the movement of the mechanical coupling link is imparted to the rotor of a selsyn generator and the servo-mechanism connected thereto actuates a servo-motor or slave member, thus supplying information to computers or the like.

What is claimed is:

1. In an electrical meter that comprises a rotatable clutch plate, means for rotating said clutch plate at a predetermined speed, a second rotatable clutch plate mounted adjacent to and in axial alignment with the first, finely divided particles of magnetic material between the plates, an electro-magnet coil arranged to receive electrical current and send flux through said magnetic particles proportional to the current, an indicator attached to said second clutch plate and means to restore said indicator; the improvement that comprises a generator of magnetic flux positioned so as to apply a fixed magnetic flux bias to said magnetic particles.

2. In an electrical meter that comprises a rotatable clutch plate, means for rotating said clutch plate at a predetermined speed, a second rotatable clutch plate mounted adjacent to and in axial alignment with the first, finely divided particles of magnetic material suspended in a liquid between the plates, an electro-magnet coil arranged to receive electrical current and send flux through said magnetic particles proportional to the current, an indicator attached to said second clutch plate and means to restore said indicator, the improvement that comprises a generator of magnetic flux positioned so as to apply a fixed magnetic flux bias to said magnetic particles.

3. In an electrical meter that comprises a rotatable clutch plate, means for rotating said clutch plate at a predetermined speed, a second rotatable clutch plate mounted adjacent to and in axial alignment with the first, finely divided particles of magnetic material between the plates, an electro-magnet coil arranged to receive electrical current and send flux through said magnetic particles proportional to the current, an indicator attached to said second clutch plate and means to restore said indicator; the improvement that comprises a permanent magnet positioned so as to apply a fixed magnetic flux bias to said magnetic particles.

4. In an electrical meter as defined in claim 3, the improvement that comprises using a permanent magnet composed of an alloy of silver, manganese and aluminum.

5. In an electrical meter that comprises a rotatable clutch plate, means for rotating said clutch plate at a predetermined speed, a second rotatable clutch plate mounted adjacent to and in axial alignment with the first, finely divided particles of magnetic material between the plates, an electro-magnet coil arranged to receive electrical current and send flux through said magnetic particles proportional to the current, an indicator attached to said second clutch plate and resilient means tending to rotate the second clutch plate in a direction opposite to the direction of rotation of the first clutch plate; the improvement that comprises a generator of magnetic flux positioned so as to apply a fixed magnetic flux bias to said magnetic particles.

6. In an electrical meter that comprises a rotatable clutch plate, means for rotating said clutch plate at a predetermined speed, a second rotatable clutch plate mounted adjacent to and in axial alignment with the first, finely divided particles of magnetic material between the plates, an electro-magnet coil aranged to receive electrical current and send flux through said magnetic articles proportional to the current and an indicator attached to said second clutch plate; the improvement that comprises the incorporation in the meter of two such magnetically-operated clutches, the provision of a linkage connected between said clutches so that the driven plates of the clutches will be connected in opposition, the provision of an indicating means attached to said linkage to indicate the state of balance between said clutches, means to restore said indicating means, means for generating magnetic flux to apply a fixed magnetic bias to the magnetic particles in each of the two clutches and the provision of conductors connecting the electro-magnetic coils of the two clutches in series opposition so that electrical current through the coils will decrease the flux in one clutch and increase the flux in the other clutch.

7. In an electrical meter that comprises a rotatable clutch plate, means for rotating said clutch plate at a predetermined speed, a second rotatable clutch plate mounted adjacent to and in axial alignment with the first, finely divided particles of magnetic material between the plates, an electromagnet coil means arranged to receive electrical current and send flux through said magnetic particles proportional to the current and an indicator attached to said second clutch plate; the improvement that comprises the incorporation in the meter of two such magnetically-operated clutches, the provision of a linkage connected between said clutches so that the driven plates of the clutches will be connected in opposition, the provision of an indicating means attached to said linkage to indicate the state of balance between said clutches, means to restore said indicating means, means for generating magnetic flux to apply a fixed magnetic bias to the magnetic particles in each of the two clutches and the arrangement of the electro-magnet coil means and bias flux means being such as to aid in one clutch when they oppose in the other so as to decrease the flux in one clutch as flux in the other clutch is increased.

EDWARD GORDON PERRY, Jr.
        ROBERT W. OLSON.

References Cited in the file of this patent

UNITED STATES PATENTS

| Number | Name | Date |
|---|---|---|
| 1,303,484 | Davies | May 13, 1919 |
| 1,684,243 | Rich | Sept. 11, 1928 |
| 2,095,208 | Wilhelm et al. | Oct. 5, 1937 |
| 2,131,759 | Satterlee | Oct. 4, 1938 |
| 2,157,094 | Beyerle | May 9, 1939 |
| 2,247,804 | Faus | July 1, 1941 |

OTHER REFERENCES

Publication I, "The Magnetic Fluid Clutch," National Bureau of Standards Technical Report 1213. Published in Wash., D. C., April 2, 1948. Copy in Div. 68–192–84.

Publication II, "A Servo Employing the Magnetic Fluid Clutch," E. S. Bettis and E. R. Mann, The Review of Scientific Instruments, vol. 20, No. 2, February 1949, pages 97–101. Published in Lancaster, Pa. Copy in Scientific Library.

Publication III, "Magnetic Fluid Clutch in Servo Applications," G. R. Nelson, Electronics, November 1949, pages 100–103. Copy in Scientific Library, 192–21.5.